US011568420B2

(12) United States Patent
Jeffs et al.

(10) Patent No.: US 11,568,420 B2
(45) Date of Patent: Jan. 31, 2023

(54) ANALYSIS OF CUSTOMER FEEDBACK SURVEYS

(71) Applicant: Verint Americas Inc., Alpharetta, GA (US)

(72) Inventors: Christopher J. Jeffs, Roswell, GA (US); Dror Daniel Ziv, Golden, CO (US); Scott Blacker, Potomac, MD (US); James G. Nies, Carmel, IN (US)

(73) Assignee: Verint Americas Inc., Melville, NY (US)

( * ) Notice: Subject to any disclaimer, the term of this patent is extended or adjusted under 35 U.S.C. 154(b) by 1232 days.

(21) Appl. No.: 14/084,979

(22) Filed: Nov. 20, 2013

(65) Prior Publication Data

US 2014/0143157 A1    May 22, 2014

Related U.S. Application Data

(60) Provisional application No. 61/729,062, filed on Nov. 21, 2012.

(51) Int. Cl.
*G06Q 30/00* (2012.01)
*G06Q 30/02* (2012.01)
*H04M 3/51* (2006.01)

(52) U.S. Cl.
CPC ....... *G06Q 30/016* (2013.01); *G06Q 30/0203* (2013.01); *H04M 3/51* (2013.01)

(58) Field of Classification Search
CPC ... G06Q 30/016; G06Q 30/0203; H04M 3/51; H04M 3/5175; H04M 3/42221; H04M 2201/40

(Continued)

(56) References Cited

U.S. PATENT DOCUMENTS 6,026,387 A * 2/2000 Kesel ..................... G06Q 30/02
                                                        706/45
7,225,139 B1 * 5/2007 Tidwell .......... G06Q 10/063114
                                                        705/7.15

(Continued)

FOREIGN PATENT DOCUMENTS

CN          1383276       * 12/2002
CN          1152488       *  6/2004

(Continued)

OTHER PUBLICATIONS

Marianna Sigala, "eCRM 2.0 applications and trends: The use and perceptions of Greek tourism firms of social networks and intelligence", 2011, Computers in Human Behavior, pp. 655-661. (Year: 2011).*

(Continued)

*Primary Examiner* — Tan D Nguyen
(74) *Attorney, Agent, or Firm* — Meunier Carlin & Curfman LLC

(57) ABSTRACT

Systems and methods of design, delivery, and analysis of customer feedback surveys include receiving interaction content. Interaction content is analyzed to identify at least one issue arising in the interaction content. A survey of a plurality of questions is automatedly created based upon the identified at least one issue. A delivery channel for the survey is determined. The survey is delivered through the determined delivery channel. A survey response with survey results data is received.

16 Claims, 3 Drawing Sheets

(58) Field of Classification Search
USPC .......................................................... 705/304
See application file for complete search history.

(56) References Cited

U.S. PATENT DOCUMENTS

| | | | | |
|---|---|---|---|---|
| 2001/0032092 | A1* | 10/2001 | Calver | G06Q 30/02 705/1.1 |
| 2002/0069207 | A1* | 6/2002 | Alexander | G09B 7/02 |
| 2002/0123925 | A1* | 9/2002 | Smith | G06Q 30/02 705/14.19 |
| 2004/0034661 | A1* | 2/2004 | Barron | G06Q 40/02 |
| 2004/0093265 | A1* | 5/2004 | Ramchandani | G06Q 30/0235 705/14.25 |
| 2004/0093268 | A1* | 5/2004 | Ramchandani | G06Q 30/0242 705/14.13 |
| 2005/0033633 | A1* | 2/2005 | LaPasta | G06Q 10/1053 434/362 |
| 2008/0077462 | A1* | 3/2008 | Patel | G06Q 20/108 705/7.33 |
| 2008/0082329 | A1* | 4/2008 | Watson | G10L 15/32 704/235 |
| 2009/0028183 | A1* | 1/2009 | Landers | G06Q 10/10 370/466 |
| 2009/0192838 | A1* | 7/2009 | Bangalore | G06Q 10/06 705/7.13 |
| 2010/0076816 | A1* | 3/2010 | Phillips | G06Q 10/00 705/7.32 |
| 2010/0122212 | A1* | 5/2010 | Boudalier | G06F 16/958 715/811 |
| 2010/0158470 | A1* | 6/2010 | Tzoukermann | G06F 17/30038 386/241 |
| 2010/0223056 | A1* | 9/2010 | Kadirkamanathan | G10L 15/02 704/235 |
| 2011/0014972 | A1* | 1/2011 | Herrmann | G06Q 30/0224 463/25 |
| 2012/0054095 | A1* | 3/2012 | Lesandro | G06Q 20/12 705/39 |
| 2012/0323675 | A1* | 12/2012 | Paparo | G06Q 30/0243 705/14.42 |
| 2012/0330812 | A1* | 12/2012 | Bouchard | G06Q 40/04 705/37 |
| 2013/0036001 | A1* | 2/2013 | Wegner | G06Q 30/02 705/14.31 |
| 2013/0077768 | A1* | 3/2013 | Pearce | G06Q 30/00 379/88.01 |
| 2013/0139229 | A1* | 5/2013 | Fried | H04L 63/08 726/5 |
| 2013/0244746 | A1* | 9/2013 | Hardy | G07F 17/3239 463/17 |
| 2013/0268260 | A1* | 10/2013 | Lundberg | G06F 16/90332 704/8 |
| 2013/0293363 | A1* | 11/2013 | Plymouth | G06Q 20/42 340/309.16 |
| 2014/0025379 | A1* | 1/2014 | Ganapathiraju | G10L 15/08 704/255 |
| 2014/0074843 | A1* | 3/2014 | White | G06Q 10/107 707/737 |
| 2014/0108494 | A1* | 4/2014 | Kahlert | G06Q 30/02 709/203 |
| 2014/0116341 | A1* | 5/2014 | Kopic | A01J 99/00 119/14.02 |
| 2014/0143018 | A1* | 5/2014 | Nies | G06Q 30/016 705/7.32 |

FOREIGN PATENT DOCUMENTS

| | | | | |
|---|---|---|---|---|
| CN | 1547719 A | * | 11/2004 | G06Q 10/10 |
| CN | 1547720 A | * | 11/2004 | G06F 9/542 |
| WO | WO-0060516 A2 | * | 10/2000 | G06Q 30/02 |
| WO | WO-0188829 A1 | * | 11/2001 | G06Q 40/06 |
| WO | WO-0225486 A1 | * | 3/2002 | G06Q 30/02 |
| WO | WO-2004114073 A2 | * | 12/2004 | G07F 17/32 |

OTHER PUBLICATIONS

Borja Gamecho, "Automatic Generation of Tailored Accessible User Interfaces for Ubiquitous Services", 2013, IEEE Transactions on Human-Machine-Systems, vol. 45, Issue 5, pp. 612-623, Abstract. (Year: 2013).*

S.C. Hui, "Data Mining for customer Service Support", 2000, Information and Management 38, pp. 1-13. (Year: 2000).*

Pattie Maes, "Agents that buy and sell", 1999, Communications of the ACM, vol. 42, No. 3, pp. 81-91. (Year: 1999).*

Amy K. Smith, "The Effect of Customers' Emotional Responses to Service Failures . . . Satisfaction Judgments", 2002, Journal of the Academy of Marketing Science, vol. 30, No. 1, pp. 5-23. (Year: 2002).*

Vishal Gupta, "A Survey of Text Mining Techniques and Applications," Aug. 2009, Journal of Emerging Technologies in Web Intelligence, vol. 1, No. 1, Aug. 2009. (Year: 2009).*

* cited by examiner

ANALYSIS OF CUSTOMER FEEDBACK SURVEYS

CROSS-REFERENCE TO RELATED APPLICATION

The present application claims priority of U.S. Provisional Patent Application No. 61/729,062, filed on Nov. 21, 2012, the content of which is incorporated herein by reference in its entirety.

BACKGROUND

The present disclosure is related to the field of speech analytics. More specifically, the present disclosure is related to the automated generation and analysis of surveys based upon analysis of communication data.

Surveys are used in order to solicit customer feedback regarding various aspects of a customer experience or perceptions of an organization. Such surveys can be sent to customers in a variety of platforms, including, but not limited to telephonic, paper, Internet based, or email surveys.

Embodiments disclosed herein leverage insights gained from analysis and processing of customer service interactions in order to present surveys to customers that may achieve a higher response rate and produce more meaningful results for an organization.

Customers response rates to surveys typically decrease as the number and complexity of the questions increases. Therefore, typically, surveys constructed to promote response rates include only a limited number of questions. This presents a problem as customer identification, demographic, or other contextual information must be solicited in the customer survey in order for the topical questions directed to specific issues to be meaningfully analyzed. However, the need for the contextual questions decreases the number of available topic or issue questions that may be asked while still attempting to promote response rate. Furthermore, generically constructed surveys may ask customers regarding unrelated or irrelevant questions relative to the customer's experience. This not only reduces response rate, but can bring decrease the value of any responses received should the customer reply.

BRIEF DISCLOSURE

An exemplary embodiment of a method of automated survey design and delivery includes receiving interaction content. The interaction content is analyzed to identify at least one issue arising in the interaction content. A survey of a plurality of questions is automatedly created cased upon the identified at least one issue. A delivery channel is determined for the survey. The survey is delivered through the determined delivery channel. A survey response is received with survey result data.

An exemplary embodiment of a method of automated customer service survey design and delivery includes receiving customer service interaction content from at least one customer service interaction. Customer metadata associated with the customer interaction content is received. The customer interaction content is stored in association with the received customer metadata. The interaction content is analyzed to identify at least one issue arising in the customer interaction content. A survey of a plurality of questions is automatedly created based upon the identified at least one issue. The survey is further associated to the customer metadata. A delivery channel for the survey is determined. The survey is delivered through the determined delivery channel. A survey response is received with survey result data. The survey result data is stored in association with the customer metadata.

A system for survey design and delivery includes a source of interaction content and a source of interaction metadata. The interaction metadata is associated to the interaction content. A database includes a plurality of survey questions and a further database includes a plurality of analytic rules. A processor is communicatively connected to the source of interaction content, the source of interaction metadata, the database comprising the plurality of survey questions, and the database comprising the plurality of analytics rules. The processor receives the interaction content and process the interaction content according to at least one analytic rule of the plurality of analytic rules to identify at least one interaction issue. The processor constructs a survey comprising a plurality of survey questions selected from the database comprising the plurality of survey questions based upon the identified at least one interaction issue. The processor selects a delivery channel for the contracted survey based at least in part upon the interaction metadata received from the source of interaction metadata. A communication system is operable by the processor to deliver the constructed survey across the selected delivery channel.

DETAILED DISCLOSURE

Figure 3:
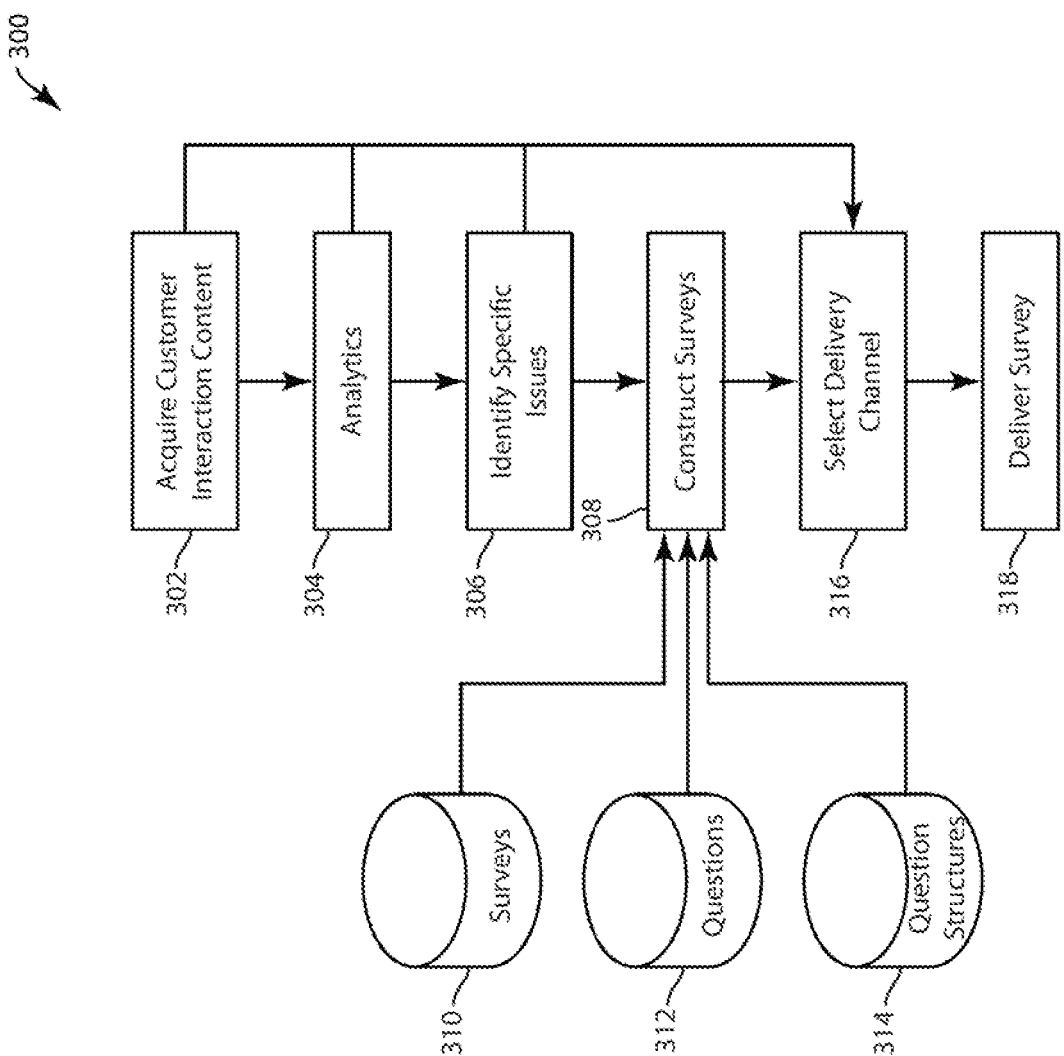
FIG. 3 depicts an exemplary embodiment of a method for designing and delivering customer feedback surveys.

Referring first to FIG. 3, FIG. 3 is a flow chart that depicts an exemplary embodiment of a method 300 of creating and delivering customer feedback surveys. The method 300 begins at 302 in which customer interaction content is acquired. In an exemplary embodiment, a customer interaction may occur over a period of time, exemplarily an hour, day, week, month, or longer and may also occur across a plurality communication channels. The communication channels may include email, telephone calls, and web chat, but may also include purchases or returns executed through a website or at a brick and mortar facility. Exemplarily with the creation of a customer identification number, each of the customer interactions across these different channels can be linked and the customer interaction content extracted for analysis. In an exemplary embodiment, the customer interaction content 302 is converted to or extracted as textual data suitable to the evaluated through text analytics 304, although it is understood that analytics may also be performed as audio or speech analytics.

In the text analytics at 304, the customer interaction content is analyzed with an ontology to identify content, themes, and/or customer sentiments in the customer interaction content. In exemplary embodiments, the analytics at 304 may include, but are not limited to keyword spotting, phonetic indexing, and phonetic searching. It is to be understood that these analytics may be performed against textual or audio data. The textual analytics can identify further information regarding the customer and the customer's experience up to the point of analysis or exemplarily through annotation of purchases and returns, other customer service concerns, requests for upgrade or a decrease of services, customer service or purchase history, reward membership status, or other reasons for customer service interaction. At 306, text analytics from 304 are used to identify the specific issue driving the customer interaction. These specific issues may be product warranties or returns, product help or questions, inquiries regarding competitive products or services, increases in service, decreases in service, or cancellation of service. In a still further exemplary embodiment, the identified issues at 306 may further include complaints or concerns regarding previous customer service interactions themselves, either for responsiveness, available channels, available customer service hours, or waiting times. The identified specific issues at 306 are then used at 308 in order to construct one or more surveys to be sent to the customer that are tailored to the identified specific issues at 306, and may further include information from the text analytics at 304. The surveys may be constructed at 308 in a variety of ways, including the selection of a survey from a plurality of previously created surveys 310. Exemplary embodiments of the previously constructed surveys 310, may include surveys regarding general customer service, company or product perception, or new products or promotions. These previously constructed survey may be available for selection based upon the text analytics and the identified specific issues of the customer service interactions.

In an alternative embodiment, the surveys may be constructed at 308 by compiling a series of previously created questions that may seek to request more specific context or combinations of context based upon the identified specific issues at 306 and the text analytics at 304. For example, a customer may have a service question regarding a specific product but also ask about available service upgrades. In that event, questions regarding both new service promotions as well as questions regarding the specific product about which the customer called may be combined into a single survey presented to the customer as described in further detail herein. Additionally, the text analytics at 304, as well as information stored associated with a customer identification number used to compile the customer interaction content, may enable the association of that customer's demographics with the newly constructed survey such that customer identification, demographics, or other contextual questions are not required in the customer survey, thus enabling the minimization of the questions in the survey while also devoting more of those minimized questions to substantive content in an effort to increase response rate and response quality.

In a still further embodiment, the surveys may be constructed at 308 with the use of pre-defined question structures that are modified or personalized based upon the identified specific issues of 306 or text analytics 304. As a non-limiting example, the customer may identify a specific device, or a specific complaint regarding a device. In such instances a question structure asking generally about a device, may be modified to specifically identify the device in the survey question. Alternatively, a generalized product quality question structure can be modified to ask about a specific product quality concern in view of the identified issue. As a still further embodiment, depending upon the customer's reward membership status, a question structure regarding promotional offers may be modified to include the promotional offers available to that customer's reward membership status.

After the survey has been constructed at 308, a delivery channel for the survey is selected at 316. In an exemplary embodiment, the survey delivery channel may include e-mail, paper, web chat, text message, or one or more of those channels to direct a customer to a web page. The selection of the delivery channel at 316 can be in part based upon the acquired customer interaction content at 302, the text analytics of 304, or the identified specific issues at 306. In or more of those features, the customer may reveal a preferred delivery channel. For example, if a majority of the customer interaction content was generally through multiple web chats, then the customer has indicated a preference or positive reception to this communication channel which may be used to deliver the survey. Alternatively, if in the text analytics the customer refers to e-mail or makes use of e-mail options rather than paper confirmations, this may be used at 316 to select e-mail as the appropriate delivery channel for that customer. In a still further embodiment, the specific issue of a customer complaining that paper statements have been replaced with emailed statements. An identified issue such as this may reflect that the customer prefers paper communication and a mailed survey may be selected as the appropriate delivery channel for this customer. After the delivery channel is selected at 316, the survey is delivered to the customer at 318 in the selected channel.

Figure 1:
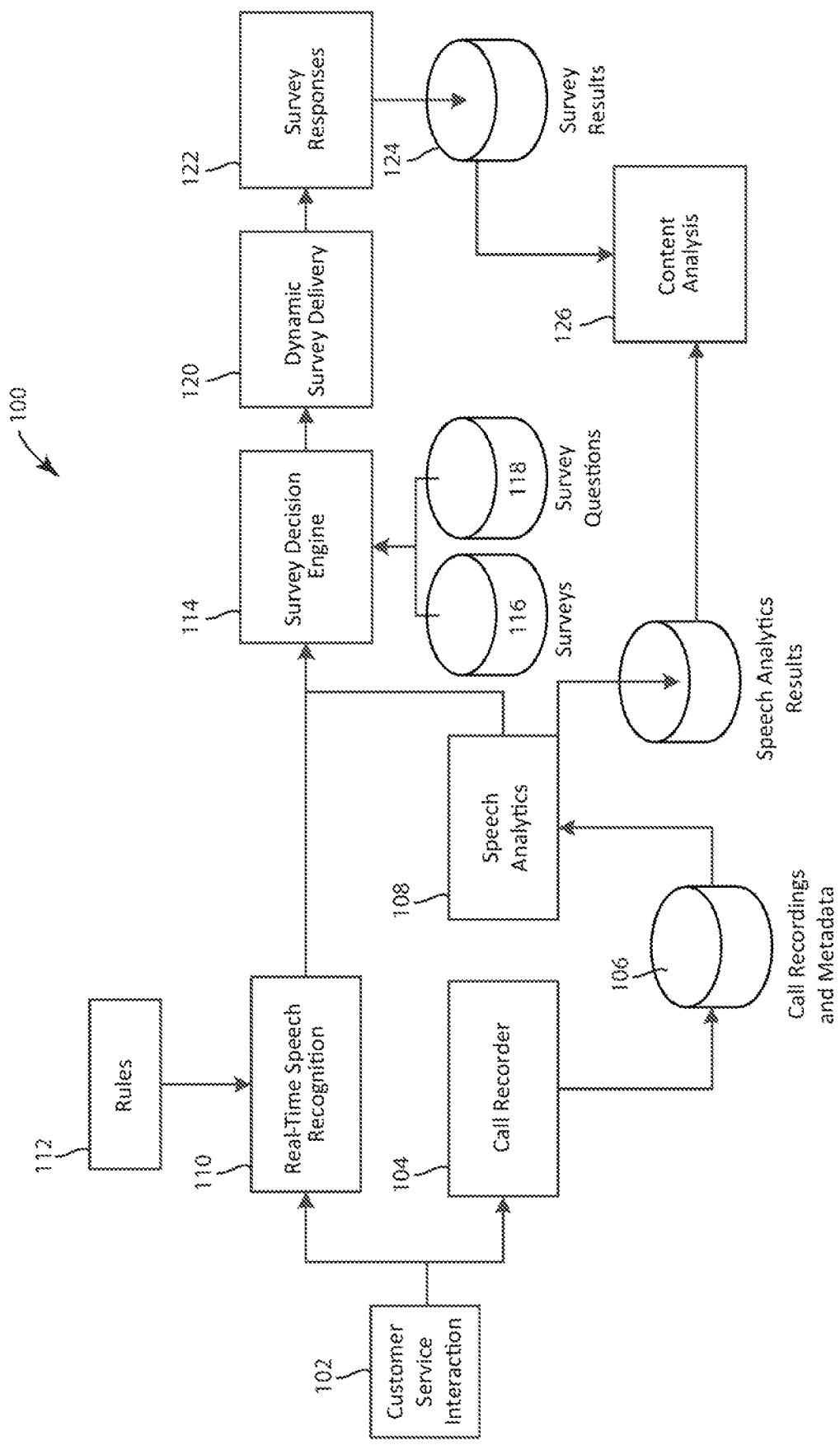
FIG. 1 depicts an exemplary embodiment of a method for designing and analyzing customer feedback surveys.
Figure 2:
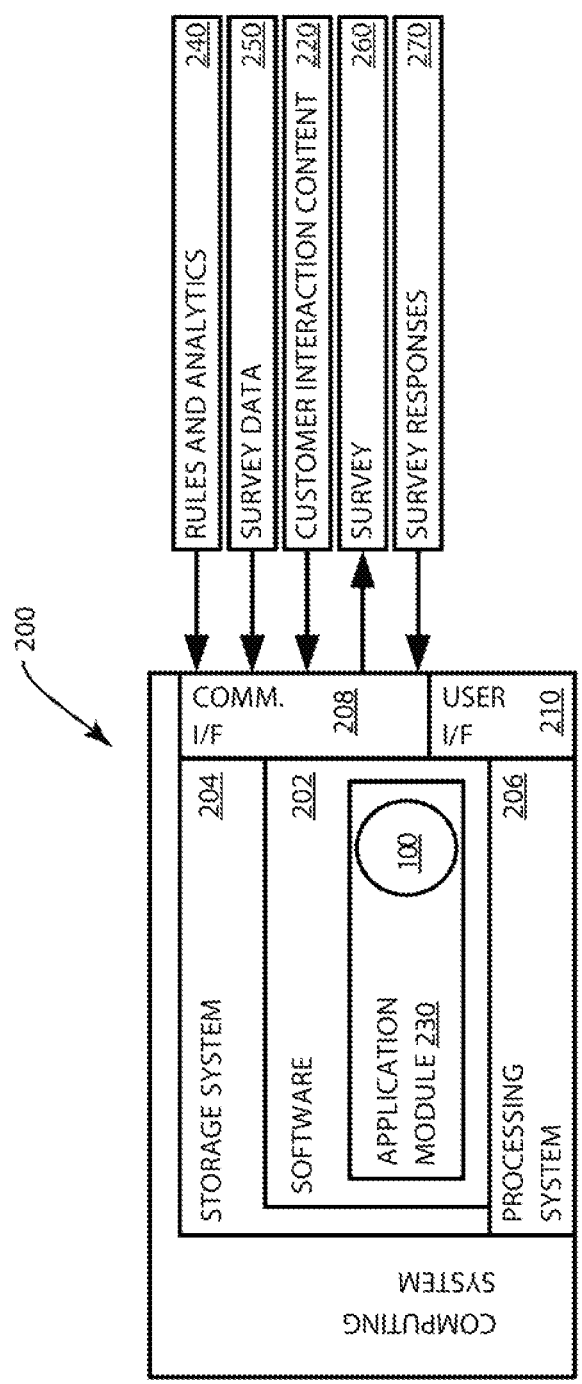
FIG. 2 is a system diagram of an exemplary embodiment of a system for designing and analyzing customer feedback surveys.

FIG. 1 depicts a more detailed alternative embodiment of a system and method for designing and analyzing customer feedback surveys. FIG. 2 is a system diagram of an exemplary embodiment of a system 200 which may be used to automatedly design, deliver, and analyze customer feedback surveys in the manners described herein with respect to the embodiment depicted in FIGS. 1 and 3. The system 200 is generally a computing system that includes a processing system 206, storage system 204, software 202, communication interface 208, and a user interface 210. The processing system 206 loads and executes software 202 from the storage system 204, including a software module 230. When executed by the computing system 200, software module 230 directs the processing system 206 to operate as described herein in further detail in accordance with the method 100 and 300.

Although the computing system 200 as depicted in FIG. 2 includes one software module in the present example, it should be understood that one or more modules could provide the same operation. Similarly, while a description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, application specific processors, and logic devices, as well as any other type of processing device, combinations of processing devices, or variations thereof.

The storage system 204 can include any storage media readable by a processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such as a controller, capable of communicating with the processing system 206.

Examples of storage media include random access memory, read-only memory, magnetic discs, optical discs, flash memory disks, virtual and non-virtual memory, magnetic sets, magnetic tape, magnetic disc storage or other magnetic storage devices, or any other medium which can be used to store the desired information and that may be accessed by an instruction execution system, as well as any combination of variation thereof, or any other type of storage media. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or a graphical display can display an interface further associated with embodiments of the system and method as disclosed herein. Speakers, printers, haptic devices, and other types of output devices may also be included in the user interface 210.

As described in further detail herein, the computing system 200 receives customer interaction content 220. Exemplarily, the customer interaction content 220 may include one or more audio files which may be audio recordings of a customer service interactions, which may exemplarily be between two speakers, although the audio recording may be of any other variety of other audio records, including multiple speakers, a single speaker, or an automated or recorded auditory message. In an embodiment as disclosed herein, the processor 200 may operate to transform the received customer interaction content 220 into a text form and further receive rules and analytics 240 for the analysis of the customer interaction content. Based upon the analysis of the customer interaction content, the processor 200 may access and receive survey data 250 with which the processor 200 constructs a survey 260 which is delivered to one or more customers in a selected delivery channel. The processor 200 may then receive survey responses which are analyzed for meaningful content and insight.

FIG. 1 depicts an embodiment of a system and a method for designing and analyzing customer feedback surveys. In embodiments of the system 100, survey content, structure, and delivery is dynamically adapted based upon identified nature or characteristics of an on-going or recently completed customer service interaction or a series of multiple customer service interactions across communication channels. By tailoring customer feedback surveys to content, topics, or sentiments found in one or more interactions with a customer, more responses and more meaningful responses can be obtained from customers.

At 102 a customer and a customer service agent have an interaction. In exemplary embodiments, the customer service interaction may include one or more communication channels, including but not limited to email, phone calls, text messages, web chat, or social media. In an exemplary embodiment, the interaction is a result of a customer calling a customer service center where a customer service agent responds to the customer's concerns. While the description found herein uses the exemplary embodiment of a phone based customer service interaction, it will be understood that this is merely exemplary and other forms of customer service interactions which may be processed in accordance with the systems and methods as disclosed herein.

At 104 a call recorder records the conversation. The call recorder 104 may also collect metadata related to the customer service interaction. Such metadata may include an agent identification, agent extension, customer identification, time, date, or any other metadata available within the information technology infrastructure. In one non-limiting embodiment, building off of the customer identification metadata, the system may access a database storing more detailed account information of the customer using information such as a customer identification account number received during the conversation, if such information is available. The call recordings and metadata can be stored in a computer readable media at 106 within a data network and the stored recordings and metadata are indexed within the network for subsequent retrieval and analysis.

At 108 analytics are applied to the stored call recordings and metadata in order to analyze the recorded conversations to identify topics within the spoken conversations as well as to identify any related trending information against those topics. Embodiments of analytics at 108 can include automated transcription and/or diarization such as may be performed in embodiments using large-vocabulary continuous speech recognition (LVCSR) or other speech-to-text techniques. Other analytic approaches may include, but are not limited to, keyword spotting, phonetic indexing, and phonetic searching. The metadata included with the call recording can be used in embodiments of the analytics in order to improve the quality of the analysis and information pulled from the recorded conversation. Analytics can be used at 108 to identify topics, trends, content, or sentiment of the conversation. In embodiments, the analytics may apply an ontology or predefined set of rules or structures for interpreting the customer interaction content. The results of the analytics can be gleaned for all transcripts, metadata pulled from open responses of the customer, categorized spoken content, and indexing/frequency of words used in the conversation.

In one embodiment, the analytics performed at 108 can be a batch processing in which the analytics are applied to the recorded conversations after the conversations are completed or in an off-line process in a system that deals with many recorded conversations either simultaneously or in sequence. In some embodiments, this may happen as soon as the call is completed or up to 24 hours from when a conversation takes place. In alternative embodiments, the analytics are applied in a later time frame, or as needed for other applications or objectives. Alternatively, at 110 real-time speech recognition processes may be applied to the conversation as it happens. In some such embodiments, speech-to-text analytics techniques may be used, including, but not limited to, LVCSR, or other speech analytics techniques that are tailored to real-time recognition. While in other embodiments, other forms of speech analytics may be used. In such embodiments, the real-time speech analytics can be used to provide in-call guidance to the customer service agent. In one embodiment, a plurality of rules are stored in a computer readable medium at 112 that are applied during the real-time speech recognition at 110 and the rules from 112 are compared against the recognized real-time speech in order to identify triggering events that are represented by the rules. The rules can include, but are not limited to, spoken conversation in the form of words and phrases, metadata values pulled from the speech recognition, agent desktop activity as monitored through desktop analytics and tracking, and/or historical information about the customer.

From either processing technique, speech or textual recognition is used to identify specific topics, events, sentiment and metadata from a conversation between a customer and a customer service agent. This information is provided to a survey decision engine at 114. The survey decision engine uses the information received from the application of the batch or real-time speech recognition and analytics to decide on the content of a survey to be provided to the customer participating in the conversation. The survey decision engine 114 may exemplarily decide between pre-formed surveys stored in a computer readable medium at 116 or from a plurality of survey questions stored at a computer readable medium at 118. If the survey decision engine 114 decides, based upon the received information about the conversation, that the customer's experience and service inquiries are best represented in a standardized survey, then the survey decision engine 114 selects one of these pre-made surveys. For example, an organization could create a plurality of standardized surveys, dealing with customer service events such as purchase, a return, a product complaint, or cancelling service.

In an alternative, the survey decision engine 114 decides from the received customer interaction content that it is desirable that the customer be asked survey questions that are not represented in a standard survey. In such an embodiment, based upon specifically identified information or events in the conversation, more specific or detailed survey questions are required. In this event, the survey decision engine 114 can select questions from the stored survey questions at 118 in order to create a customized survey. In a non-limiting example of a customer service call requesting cancellation of service, while a generalized survey stored at 116 may be selected, in an alternative, the conversation information provided to the survey decision engine 114 may identify that the customer was switching to a service of a known competitor and questions specifically about that competitor can be selected from survey questions at 118 to specialize the survey. These more specific questions may be able to draw more specific information based upon the customer statements during the recorded conversation. In a further non-limiting embodiment, the speech analytics of the conversation may identify that the customer calling in for service was highly frustrated with the product/service/organization. In this event, a customized survey may be created by the decision engine 114 that has additional questions related to customer service/satisfaction. These additional questions may be in the form of a standardized customer satisfaction survey stored at 116 or individualized customer survey questions that may be specifically tailored to a particular product or service selected from 118.

In a still further embodiment, the survey may be constructed by completing question structures with content or other information obtained through the customer service interactions to tailor the questions to the experiences and concerns of the customer. In other embodiments, a combination of stock surveys, survey questions, or question structures may be used to construct the survey for the customer.

In a still further embodiment, the survey decision engine 114 receives metadata regarding the customer participating in the conversation. This metadata may be extracted from the conversation itself or may be extracted from a customer account history or other sources of customer data linked to the conversation Once this basic customer information is identified, which may include demographics, purchasing history, age, address, sex, income, then these normally used filtering questions regarding these customer aspects are not required if the survey can be linked to a specific customer. It has been observed that customer feedback surveys often have a low response rate, and this response rate is even lower as the number of survey questions increases. Therefore, in order to increase customer survey response rates, the total number of questions is desired to be kept at a minimum. By eliminating filtering or demographic questions in favor of only selecting specific questions that are highly relevant to the customer service interaction that the customer just had, the customer feedback surveys can become less of a burden and of more interest to the customer, with the intended result of increasing customer response rates.

In a still further embodiment, the customer information included with the customer account may indicate a customer as being a highly engaged or responsive customer, having completed multiple customer surveys. This may be an indication that this customer has a high likelihood of responding to a subsequent customer survey. Therefore, after being identified as a particularly responsive customer, questions to which responses are highly desired may be selected to be included in a survey sent to that customer. Additionally, questions regarding why the customer is particularly engaged or asking the customer to engage in further participation, exemplarily, as being pan of a panel or other customer information gathering setting, may be incorporated into the survey.

Once the specific questions to be used in the customer feedback survey are determined by the survey decision engine 114, dynamic survey delivery at 120 determines the form and channel across which the survey is provided to the customer. A number of communication platforms and survey styles are available and each have benefits and limitations. Non-limiting examples of customer feedback survey formats include interactive voice response (IVR) surveys delivered as a part of the customer service conversation, short message service (SMS), surveys wherein the customer is prompted with a series of text messages and replies by text message, web chat surveys, email surveys where the customer receives an email and responds in an email, and web based surveys wherein the customer visits a web site and submits responses through the web site. Of course, it is understood that this is a non-limiting list of survey examples and other survey formats may be used within the scope of this disclosure, including hybrid formats that use a combination of one or more of the above noted methods.

The dynamic survey delivery at 120 uses the information from the conversation and/or the selected questions for the survey in order to determine the appropriate format for the survey. For example, some survey formats, such as a web based formats, are more conducive to present greater numbers of survey questions, whereas if only a few survey questions are asked, formats such as SMS can be effective, particularly among technology savvy customers. It is to be noted that while IVR can be used at any time, including a scheduled follow up IVR customer feedback survey, if an IVR survey is going to be offered as a part of the original customer service conversation, then an embodiment with real-time speech recognition is necessary in order for the survey questions to be selected and surveys to be prepared for presentation to the customer by the time that the customer service conversation ends.

In a still further non-limiting example, it has been observed that when a customer either has a poor customer service interaction with the customer service agent, or is upset about the product or service resulting in the call to the customer service agent, customer feedback surveys can receive a more favorable response and response rate if the surveys are held for a couple of days in a "cooling off period" to remove the customer from the emotion from the interaction itself. Therefore, the dynamic survey delivery 120 may take into account metadata or identified sentiments from the conversation in order to identify if such a cooling off period is required and an appropriate survey format and delay may be selected for the customer feedback survey. In still further embodiments, the dynamic survey delivery 120 can use a combination of surveys or survey techniques in response to a single customer. In one non-limiting example, a plurality of specifically selected survey questions from 118 may be presented to the customer as part of the original conversation using an IVR survey, while a more generalized survey from 116 is presented to the customer in an email format in the days after the customer service interaction.

The customer's feedback survey responses are collected at 122. As previously disclosed, the customer feedback surveys can come in a variety of formats, and each of these formats solicit different types of formatted survey responses. The responses from across numerous channels, such as IVR, SMS, email, and web based surveys, are collected from these various platforms and are analyzed to identify and interpret the content of those responses. In non-limiting examples, if a question calls for a numerical or quantitative answer, these quantitative answers are all recorded in relation to the specific questions. In free form responses, which may be either spoken responses, as in the case of IVR, or textual responses as in the case of email or web based surveys, the text is recorded and analyzed to identify and characterize the content of the responses. All of the survey responses collected at 122 are then stored at 124. In the storage of the survey responses, not only is each response stored, but also the relationship of the responses both to the customer that provided them as well as the survey question that solicited the recorded response. In some embodiments, the survey response may further be stored as customer interaction content to be used in the generation and use of future customer feedback surveys.

At 126 the survey results can be analyzed either on their own or in connection with the stored speech analytics results, or other customer metadata collected by the organization. In one example, the survey responses to a particular question can be separated by a particular type of metadata about the customers that provide those responses. As a non-limiting example, the customers are divided into two groups based upon whether the customer cancels service or increases service. The survey responses can then also be divided based on the customers that exhibit this criteria. In this manner, a better picture or understanding of the customer feedback of particular sets of customers can be looked at together or comparatively against another group. In a particular advantage of embodiments, association of customer metadata to the surveys or survey response offer more available categories for sorting and analysis rather than reliance upon survey demographic or contextual question answers.

In an alternative embodiment, the survey responses can be used to group the customers, or specific customer interactions, into groups. For example, all of the customer service interactions that resulted in positive feedback can be compared against the customer service interactions that resulted in negative feedback. In a non-limiting example, the speech analytics from those recorded customer service interactions can be analyzed in order to identify if particular topics, words, or phrases are associated with positive or negative feedback. In another non-limiting example, two different variants in scripts used by the customer service agents in the customer service interactions with the customer can be compared to determine if one script or the other results in more favorable customer feedback response. By analyzing the spoken words in the customer service interaction through the speech analytics result, the system is able to identify spoken topics that are related to differing customer feedback survey responses. In embodiments, the integration of the customer feedback surveys with the recorded customer service interactions and speech analytics of those interactions can further facilitate a customer data mining by being able to separate customers into various pools based upon responses to the same or similar customer feedback survey questions. After the customers and/or specific customer service interactions are divided into these groups, the characteristics or features of these groups of customers or specific customer interactions can be compared in the aggregate to those found in the other groups that resulted in different customer feedback survey responses. In a related embodiment, the survey answers can be used to group customers based upon a survey response, exemplarily favorable responses versus unfavorable responses. Then the system can analyze all recorded customer service interactions or all recent recorded customer service interaction in these groups to obtain an analysis of not only a most recent interaction, but a customer's history of customer service interaction in view of a survey response.

In a still further aspect, the survey results and/or the speech analytics results can be used to create new customer surveys to be stored at 116 or customer survey questions to be stored at 118. The newly created surveys or questions can be created in order to specifically address identified emerging or trending issues as identified by the speech analytics of recent customer survey interactions, or customer survey results, including free form results. In a non-limiting example, if the introduction of a new product has resulted in an increased number of customer service interactions identifying topics or terms such as quality, warranty claims, or specific components are identified, then surveys or survey questions can be created that target not only the specific product, but the solution of workouts presented by the customer service agents according to an organization approved response or script. These new questions to trending or emerging topics can then be selected for inclusion by the survey decision engine 114 when a new customer service interaction appears to be also related to these topics. In still further embodiments, issued identified as trending or emerging in other customer, channels, or product lines may be used to formulate survey questions either about these cross products or service, or a customer's perception of the broader products or services offered by an organization. These such questions can then be made available in a single database of customer surveys or customer survey questions that is available to the survey decision engine so that the survey decision engine 114 can make appropriate survey question selections for a wide variety of customer service interactions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for identifying and responding to trending customer issues at a customer service center based on electronically stored interactions between customers and the customer service center, the method comprising:
accessing, by a survey decision engine, a plurality of transcriptions of interaction content of customer interactions, the customer interactions via a plurality of communication channels, wherein each transcription of interaction content is stored electronically with metadata and wherein each transcription interaction content and the metadata correspond to an interaction between a customer and a customer service agent at the customer service center via an interaction channel from among the plurality of communication channels;
for each transcription of the plurality of transcriptions:
analyzing, by the survey decision engine, substantive content of the transcription, and other customer interactions associated with the customer, using an ontology and text analytics to identify a plurality of topics of the interaction and specific issues corresponding to the topic, wherein the other customer interactions comprise a purchase history associated with the customer and the text analytics include one or more of keyword spotting, phonetic indexing, and phonetic searching;
based on the plurality of topics of the interaction and the specific issues corresponding to the topic identified for the transcription, determining, by survey decision engine, whether to use a standard survey or a customized survey for the customer associated with the transcript; and
in response to determining that a customized survey should be used for the customer:
for each identified topic of the plurality of topics, retrieving, by the survey decision engine, pre-defined question structures from a database based on the identified topic;
determining, by the survey decision engine, a customer identification number associated with the customer associated with the transcription;
retrieving, by the survey decision engine, information associated with the customer based on the customer identification number;
automatedly modifying, by the survey decision engine without user input, the pre-defined question structures to include the identified specific issues to form questions for a customized survey specific to the customer to create first modified pre-defined question structures in response to the retrieving;
determining, by the survey decision engine, a reward membership status associated with the customer;
automatedly modifying, by the survey decision engine without user input, the first modified pre-defined question structures based on the reward membership status to create second modified pre-defined question structures in response to determining the reward membership status;
automatedly creating, by the survey decision engine, the customized survey comprising the questions specific to the customer from the second modified pre-defined question structures;
analyzing, by the survey decision engine, the substantive content of the transcription using pre-defined speech analytics to determine a delivery channel for the customized survey;
automatedly delivering, by the survey decision engine, the customized survey through the determined delivery channel, wherein the delivery channel is paper mail;
receiving, by the survey decision engine, a survey response with survey results via one of a plurality of delivery platforms;
automatedly analyzing, by the survey decision engine, the survey results and identifying a trending issue based on survey results from a plurality of customers; and
automatedly creating, by the survey decision engine, additional survey questions regarding the identified trending issue and storing the additional questions with the pre-defined question structures for creating subsequent surveys related to the identified trending issue.

2. The method of claim 1, wherein the interaction content comprises audio data of a telephone call made by a customer to a customer service center.

3. The method of claim 2, wherein the audio data is transcribed by a speech recognizer.

4. The method of claim 2, wherein the metadata identifies the customer.

5. The method of claim 4, further comprising:
automatedly creating the survey before the end of the customer service interaction; and
automatedly delivering the survey to the customer as a part of the customer service interaction.

6. The method of claim 1, wherein the delivery channel is selected from email, interactive voice response, text message, web chat, or online delivery channels.

7. The method of claim 1, further comprising:
analyzing substantive content of the transcription using pre-defined speech analytics to identify one or more sentiments;
selecting a delay for the survey based on the identified one or more sentiments, wherein the delay comprises a number of days; and
automatedly delivering the survey through the determined delivery channel to the customer according to the delay.

8. The method of claim 1, wherein automatedly delivering the survey through the determined delivery channel comprises:
automatedly delivering a first portion of the survey through a first delivery channel; and
automatedly delivering a second portion of the survey through a second delivery channel, wherein the first delivery channel and the second delivery channel are different, and further wherein the second delivery channel is the same as the interaction channel.

9. The method of claim 8, further comprising:
analyzing substantive content of the transcription using pre-defined speech analytics to identify one or more sentiments;
selecting a delay based on the identified one or more sentiments, wherein the delay comprises a number of days; and
automatedly delivering the second portion of the survey according to the delay.

10. The method of claim 1, further comprising:
identifying a device mentioned in the transcription; and
automatedly modifying the pre-defined question structures to identify the device.

11. A system for identifying and responding to trending customer issues at a customer service center based on electronically stored interactions between customers and the customer service center, the system comprising:
- a recorder recording a plurality of transcriptions of interaction content of customer interactions, the customer interactions via a plurality of communication channels and metadata with a respective interaction, wherein each transcription of interaction content and metadata is stored with the interaction content electronically, wherein the interaction content and the metadata correspond to an interaction between a customer and a customer service agent at the customer service center via an interaction channel from among the plurality of communication channels;
- a processor communicatively coupled to the call recorder, the processor configured by software instructions to, for each transcription of the plurality of transcriptions:
  - analyze substantive content of the transcription, and other customer interactions associated with the customer, using an ontology and text analytics to identify a plurality of topics of the interaction and specific issues corresponding to the topic, wherein the other customer interactions comprise a purchase history associated with the customer and the text analytics include one or more of keyword spotting, phonetic indexing, and phonetic searching;
  - based on the plurality of topics of the interaction and the specific issues corresponding to the topic identified for the transcription, determine whether to use a standard survey or a customized survey for the customer associated with the transcript; and
  - in response to determining that a customized survey should be used for the customer:
    - for each identified topic of the plurality of topics, retrieve pre-defined question structures from a databased based on the identified topic from a memory communicatively coupled to the processor;
      - determine a customer identification number associated with the customer associated with the transcription;
      - retrieve information associated with the customer based on the customer identification number;
      - automatedly modify, without user input, the pre-defined question structures to include the identified specific issue to form questions for a customized survey specific to the customer to create first modified pre-defined question structures in response to the retrieving;
      - determine a reward membership status associated with the customer;
      - automatedly modifying, without user input, the first modified pre-defined question structures based on the reward membership status to create second modified pre-defined question structures in response to determining the reward membership status;
    - automatically create the customized survey comprising the questions specific to the customer from the second modified pre-defined question structures;
    - analyze the substantive content of the transcription using the pre-defined speech analytics to determine a delivery channel for the customized survey;
  - automatedly deliver the customized survey through the determined delivery channel to the customer, wherein the delivery channel is paper mail;
  - receive a survey response from the customer via a communication interface, the survey response comprising survey results;
  - automatedly analyze the survey results and identify a trending issued based on the set of survey results; and
  - automatedly create additional survey questions regarding the identified trending issue and store the additional questions with the pre-defined question structures for creating subsequent surveys related to the identified trending issue.

12. The system according to claim 11, wherein the interaction content comprises audio data of a telephone call made by a customer to a customer service center.

13. The system according to claim 12, wherein the audio data is transcribed by a speech recognizer.

14. The system according to claim 12, wherein the metadata identifies the customer.

15. The system according to claim 14, wherein the processor is further configured by software to:
- automatedly create the survey before the end of the customer service interaction; and
- automatedly deliver the survey to the customer as a part of the customer service interaction.

16. The system according to claim 11, wherein the delivery channel is selected from email, interactive voice response, text message, web chat, or online delivery channels.

* * * * *